US006493072B1

United States Patent
Medberry et al.

(10) Patent No.: US 6,493,072 B1
(45) Date of Patent: Dec. 10, 2002

(54) SYSTEM AND METHOD FOR COUPLING LIGHT THROUGH A WAVEGUIDE IN A PLANAR OPTICAL DEVICE

(75) Inventors: John Medberry, Windsor, CO (US); Benno Guggenheimer, Fort Collins, CO (US); David Washburn, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/967,453

(22) Filed: Sep. 28, 2001

(51) Int. Cl.[7] .............................................. G01N 21/00
(52) U.S. Cl. ................................................. 356/73.1
(58) Field of Search ............................. 356/73.1, 614, 356/615–624; 385/49, 52, 15, 51, 147, 25, 73, 74, 75, 88, 90, 93

(56) References Cited

U.S. PATENT DOCUMENTS

| | | | |
|---|---|---|---|
| 4,488,773 A | * 12/1984 | Wagner | 385/12 |
| 5,187,375 A | 2/1993 | Masten | |
| 5,220,407 A | * 6/1993 | Yamane et al. | 356/615 |
| 5,553,182 A | * 9/1996 | Haake | 385/49 |
| 6,280,100 B1 | * 8/2001 | Haake | 385/73 |

* cited by examiner

Primary Examiner—Frank G. Font
Assistant Examiner—Tu T. Nguyen

(57) ABSTRACT

A system and method for finding the position of a waveguide in a planar optical device that has application to the coupling of light to a planar optical waveguide without connectors. The system comprises input and output optical fiber probes, a light source, a photo or light detector and a optical power meter. The light detector is positioned at the exit of the optical waveguide of interest. Typically, the position of the waveguide will be known with some window of uncertainty. Assuming that the photo detector is a photodiode, the area of the photodiode is preferably large enough that the exit of the waveguide can be assumed to lie within the detection area of the photodiode. The input optical fiber probe is coupled to the light source and is moved across the uncertainty window of the entry to the waveguide. The light transmitted through the waveguide to the photo detector is measured and used to find the position of the entry to the way guide. The input fiber probe is then positioned at the entry to the waveguide. The output fiber probe is then coupled to the optical power meter and used to scan for the exit for the waveguide.

13 Claims, 7 Drawing Sheets

SYSTEM AND METHOD FOR COUPLING LIGHT THROUGH A WAVEGUIDE IN A PLANAR OPTICAL DEVICE

FIELD OF THE INVENTION

This invention relates generally to the field of assembly and test of electronic or optical components, such as integrated optical devices, and in particular to the coupling of light to planar optical waveguides.

BACKGROUND OF THE INVENTION

The assembly and test of devices, such as integrated optical devices, require accurate alignment of components. For example, the assembly process for coupling optical fibers to optical chip components requires mechanical positioning to within 1 micron or less. The mechanical repeatability of chip placement equipment or manual loading of an optical chip into a test and assembly station is much greater than 1 micron. Thus the position of the optical waveguide within a chip with respect to the mating fibers is known to an accuracy of no better than several microns. Consequently, additional steps must be taken to locate the waveguide within this window of uncertainty.

When coupling light to and receiving light from a planar optical device, a light emitting optical fiber probe is coupled to a waveguide on the device. Light travels through the waveguide and is received by another optical fiber probe or array of probes on the other side of the waveguide. In most applications, the locations of the optical fiber probes and the device itself are not known accurately enough to allow for successful coupling based on mechanical repeatability of the system.

One prior approach is the use of a microscope together with manual positioning of the components. This approach requires trained and skilled operators. This is expensive and is subject to human error.

Another approach is the use of video microscopes in combination with image processing software and computer control of the positioning device. The equipment required typically includes two digital cameras, objective lenses, illumination equipment, an image processing acquisition system and processing software to interpret the image. This type of equipment is expensive and relatively slow, and measurement accuracy is limited to a few microns.

Moreover, the equipment used in these approaches tends to obstruct other processing equipment required to complete the assembly and test processes.

Accordingly, there is an unmet need in the art for a method and a system capable of finding the location of a waveguide in planar optical device that is both accurate and amenable to automation.

SUMMARY OF THE INVENTION

The invention relates generally to a system and method for finding the position of a waveguide in a planar optical device and has application to the coupling of light to a planar optical waveguide without connectors. The system comprises input and output optical fiber probes, a light source, a light detector or photodetector such as a large area photodiode and an optical power meter such as a photodiode power meter. According to the method the light detector is positioned at the exit of the optical waveguide of interest. Typically, the position of the waveguide is known to be within some window of uncertainty. Preferably, the area of the photodetector, which may be a large area photodiode, is large enough that the exit of the waveguide can be assumed to lie within the detection area of the light detector. The input optical fiber probe is coupled to the light source and is moved across the uncertainty window of the entry to the waveguide. The light transmitted through the device to the photodetector is measured and used to find the position of the entry to the waveguide. The input optical fiber probe is then positioned at the entry to the waveguide. The output optical fiber probe, which is coupled to an optical power meter, is used to scan for the exit for the waveguide. The probes may be moved automatically or manually.

BRIEF DESCRIPTION OF THE DRAWINGS

The novel features believed characteristic of the invention are set forth in the claims. The invention itself, however, as well as the preferred mode of use, and further objects and advantages thereof, will best be understood by reference to the following detailed description of an illustrative embodiment when read in conjunction with the accompanying drawing(s), wherein:

DESCRIPTION OF THE INVENTION

Figure 1:
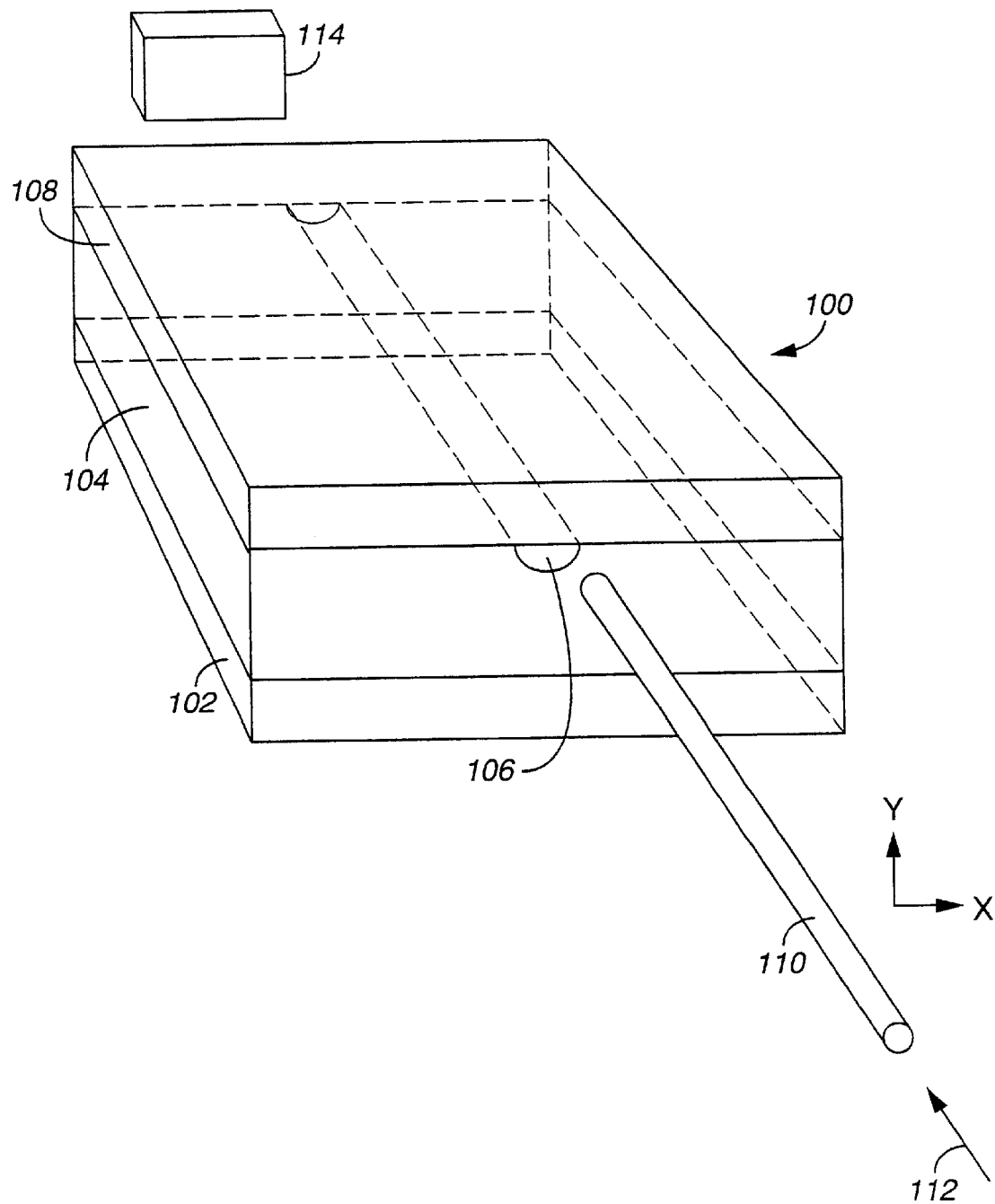
FIG. 1 is a diagrammatic representation of a system of the present invention configured to locate the entry to an optical waveguide.

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

When coupling light to and receiving light from a planar optical device, a light emitting optical fiber probe or array of probes is coupled to a waveguide on the device. Light travels through the waveguide and is received by another optical fiber probe or array of probes on the other side of the waveguide. In most applications, the locations of the optical fiber probes and the device itself are not known accurately enough to allow for successful coupling based solely on mechanical repeatability of the system. For example, even if the waveguide in a first device was aligned accurately by manual adjustment and position noted, it would not be possible to guarantee moving a second device close enough to the same position because of uncertainties in the locations of the waveguides with respect to the optical fiber probes. The present invention is directed towards finding the location of an optical waveguide within a planar optical device with respect to the fiber optic probes, thus allowing for automated test, measurement and assembly of the device.

A diagrammatic representation of a system of the present invention configure to locate the entry to a waveguide is shown in FIG. 1. Referring to FIG. 1, planar optical device 100 comprises a base substrate layer 102, a core/cladding layer 104 and a glass lid layer 108. The core/cladding layer 104 contains the optical waveguide portion 106 of the device. The glass lid layer is used to sandwich the waveguide, facilitating polishing and coupling to the waveguide. Input optical fiber probe 110 may be a bare optical fiber or a matrix of optical fibers captured in a glass array holder. A probe containing a matrix of fibers may be used to perform multiple scans simultaneously, thereby reducing the time taken to locate the entry to the waveguide. The input optical fiber probe 110 is excited by a laser light source 112 at one end.

The position of the entry to the waveguide 106 relative to the input optical fiber 110 is known to within the repeatability of the mechanical positioning device as well as the manufacturing tolerance on the device. This leaves a window of uncertainty for the position of the waveguide, which may be 100 microns high and 200 microns wide for a 5 micron waveguide.

The first step of the process is the identification of the position of the entry to the waveguide. A large area photodiode 114, or other light- or photo-detector, is positioned at the exit to the waveguide of interest. The positioning of the large area photodiode 114 is not critical, provided that the dimensions of the photodiode are larger than the uncertainty window for the exit of the waveguide.

The input optical fiber 110 is positioned at or below the lower edge of the uncertainty window for the entry to the waveguide and is aligned to be substantially parallel to the waveguide. In FIG. 1, the input optical fiber is moved upwards in the positive Y-direction (as indicated) across the vertical dimension of the uncertainty window. In general, this direction is substantially perpendicular to the plane of the interface between the core/cladding layer and the glass lid, although it may vary depending on the cleave angle of the device. The optical fiber probe may be positioned using manually actuated or servo-driven positioning stages. Such positioning stages are known in the art, and stages capable of moving an object in increments of 50 nano-meters or less are available commercially.

The output from the large area photodiode is monitored. Within the range of the uncertainty window, the output from the large area photodiode will register a peak where the light couples across the interface between the core/cladding layer and the glass lid. The waveguide is located at a known vertical distance from this interface, and so the vertical position of the entry to the waveguide is identified. The input optical fiber 110 is then positioned at the identified vertical position and is moved in a horizontal (X) direction to scan the horizontal dimension of the uncertainty window. This direction is parallel to the face of the optical device containing the waveguide entry and perpendicular to the Y-direction. The position where the output from the photodiode is maximized corresponds to the location of the waveguide. In this manner, both the vertical and horizontal positions of the waveguide are identified.

Other scan directions may be utilized. However, the first scan direction should cross the interface between the core/ cladding layer and a covering layer, such as the glass lid, at some position in the scan. If the covering layer is opaque relative to the core/cladding layer, the photodiode output will drop as light from the optical probe is blocked by the covering layer. In this case, the output may be compared with a threshold output level to determine the location of the interface between the core/cladding layer and the covering layer.

Figure 2:
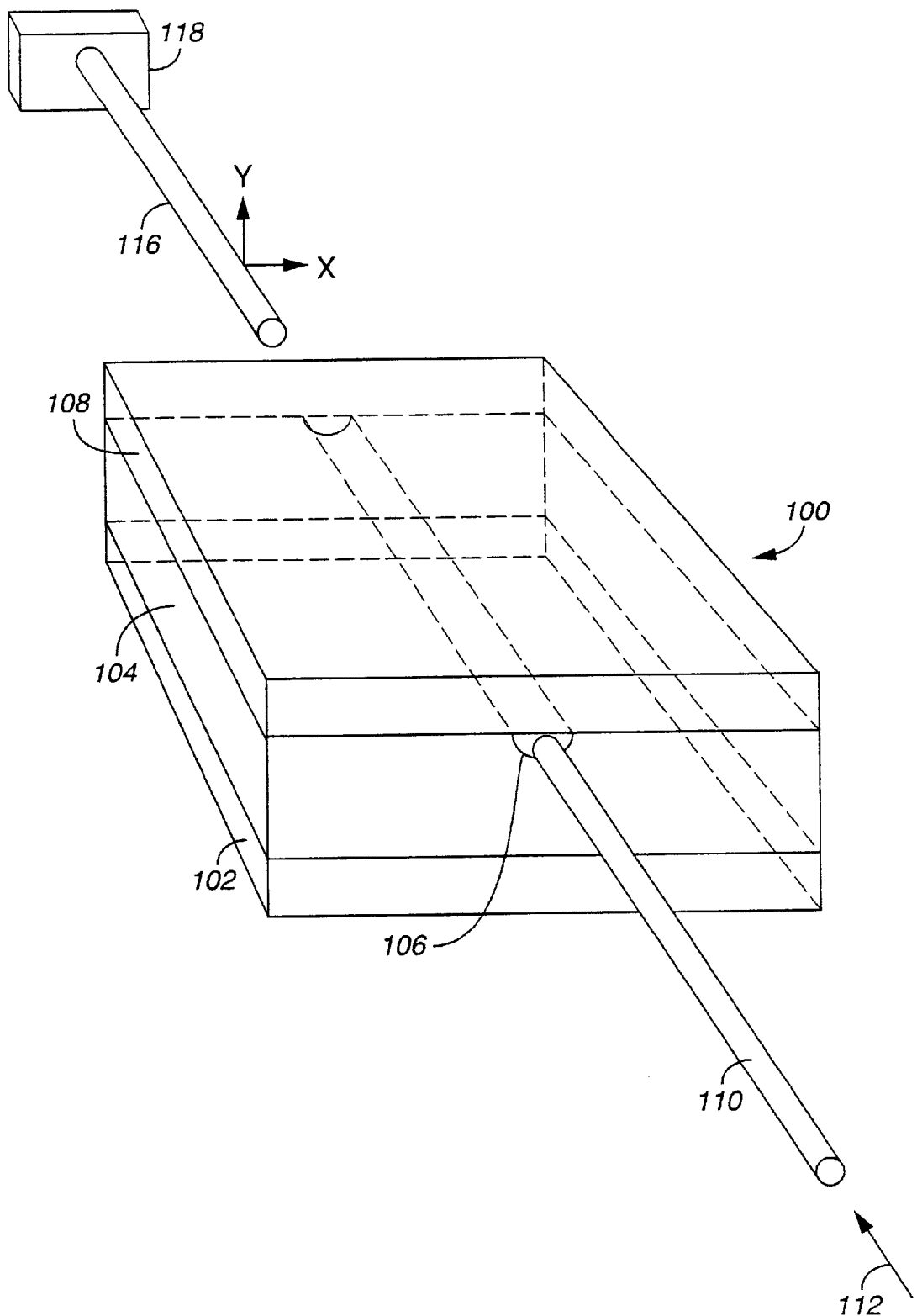
FIG. 2 is a diagrammatic representation of a system of the present invention configured to locate the exit from an optical waveguide.

Next in the process is the identification of the position of the exit from the waveguide. Referring now to FIG. 2, the input optical fiber probe 110 is placed at the entry to the waveguide 106, which was identified previously. The large area photodiode is replaced by an output optical fiber probe 116 positioned in proximity to the exit to the waveguide. The output optical fiber probe 116 is optically coupled to a photodiode power meter 118 or other optical detector. The output optical fiber 116 is positioned at or below the lower edge of the uncertainty window for the exit from the waveguide and is aligned to be substantially parallel to the waveguide. The output optical fiber probe is moved upwards in the positive Y-direction (as indicated in FIG. 2) across the vertical dimension of the uncertainty window. The output from the optical power meter is monitored. Within this range of motion, the output from the optical power meter will register a peak where the light couples the core/cladding layer of the device. This identifies the vertical location of the waveguide. The output optical fiber probe 116 is then positioned at the identified vertical position and is moved in a horizontal (X) direction to scan the horizontal dimension of the uncertainty window. The position where the output from the optical power meter is maximized corresponds to the location of the waveguide exit. In this manner, both the vertical and horizontal positions of the waveguide exit are identified. The output optical fiber probe is then positioned at this location. The output optical fiber probe 116 may be a bare optical fiber or a matrix of optical fibers captured in a glass array holder.

In addition to movement in the X- and Y-directions, the angle of the probe relative to the face of the optical device may be adjusted to maximize the light received by the probe.

At this point in the process, light is coupled across the device. A third, optimization, step may optionally then be performed in which the output from the photodiode power meter is maximized by adjusting the positions of the input and output optical fiber probes. The adjustment may be performed manually or automatically.

With the optical fibers in the resulting optimized positions, the device may be subject to measurement and test or final bonding and assembly of the optical fiber probes may be performed.

In one embodiment, the positioning stages are controlled automatically by a controller.

Figure 3:
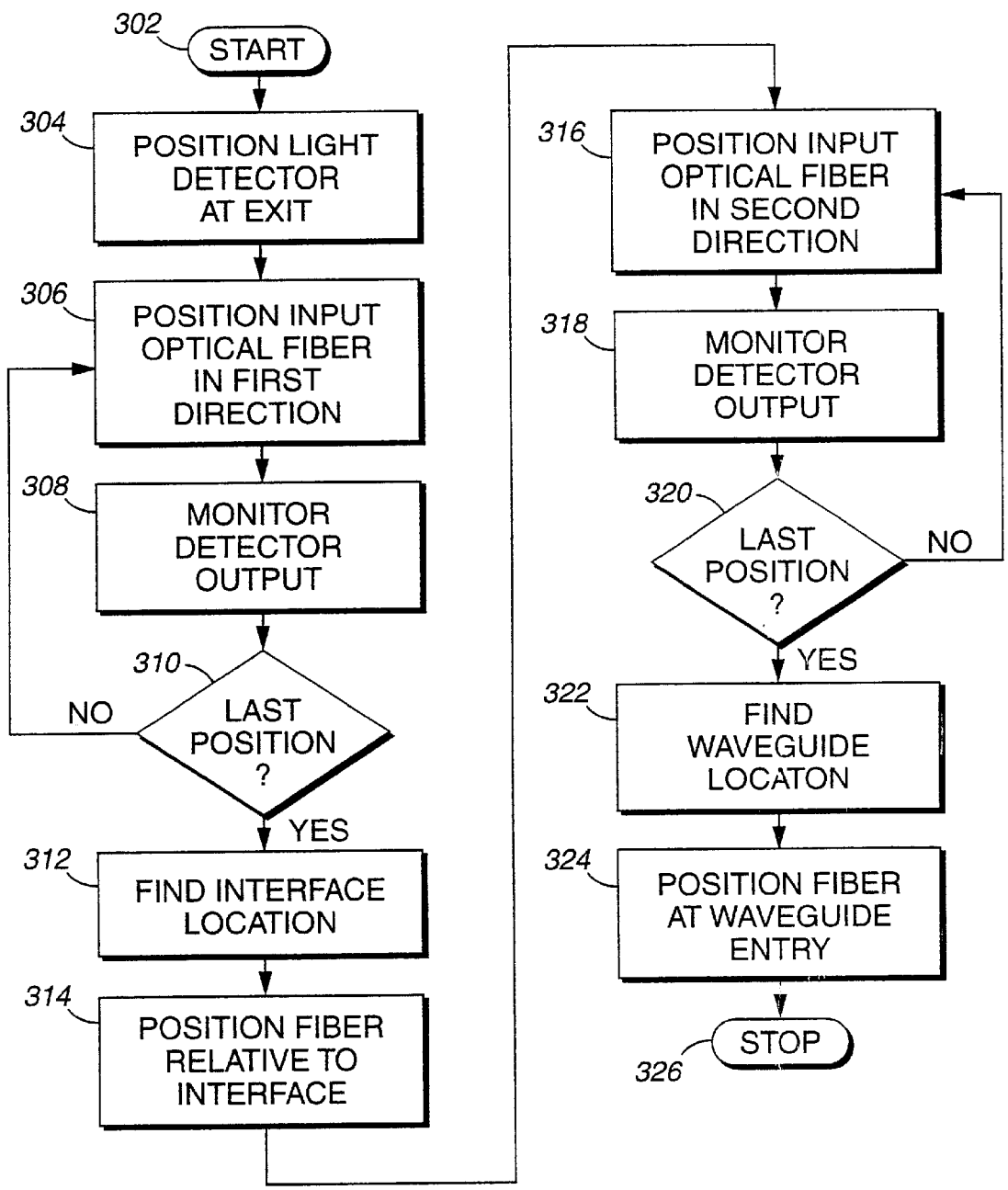
FIG. 3 is a flowchart of a method for locating the entry to an optical waveguide according to the present invention.

A flowchart of the preferred method for determining the entry to an optical waveguide is shown FIG. 3. Following start block 302, a large area photodiode or other light detector is positioned in the exit of the waveguide at block 304. Preferably, the area of the detector is larger than the region of uncertainty for the position of the exit to the waveguide. An input optical fiber, connected to a light source, is positioned in proximity to the entry to the waveguide at block 306. At block 308, the output from the light detector is monitored. The input optical fiber is then repeatedly moved in a first direction, substantially perpendicular to plane of the interface between the core/cladding layer and a covering layer, to a new position. The output from the light detector is monitored at each position. After each new position is monitored, a check is made at decision block 310 to determine if this is the last position within the window of uncertainty for the entry position. If it is not, as denoted by the negative branch from decision block 310, the input optical fiber is moved to a new position. If it is the last position, as depicted by the affirmative branch from decision block 310, the position of the interface between the core/cladding layer and the covering layer in the first direction is determined at block 312 as the input optical fiber position for which the monitored light detector output was at a local maxima value corresponding to point B of FIG. 5. This point can be determined though various forms of signal processing. The entry to the optical waveguide is at a predetermined distance in the first direction from the interface. The input optical fiber is then positioned in the first direction at the entry to the optical waveguide and in a second direction in the proximity of the waveguide, as indicated by block 316.

At block 318, the output from the light detector is monitored. The input optical fiber is then repeatedly moved in the second direction, substantially perpendicular to the first direction and parallel to the face of the optical device containing the entry to the waveguide, to a new position. The output from the light detector is monitored at each position. After each new position is monitored, a check is made at decision block 320 to determine if this is the last position within the window of uncertainty for the entry position. If it is not, as denoted by the negative branch from decision block 320, the input optical fiber is moved in the second direction to a new position. If it is the last position, as depicted by the affirmative branch from decision block 320, the position of the waveguide in the first direction is determined at block 322 as the input optical fiber position for which the monitored light detector output was at a maximum. At block 324, the input optical is positioned, in the first and second directions, at the entry to the optical waveguide. The process is terminated at block 326.

Figure 4:
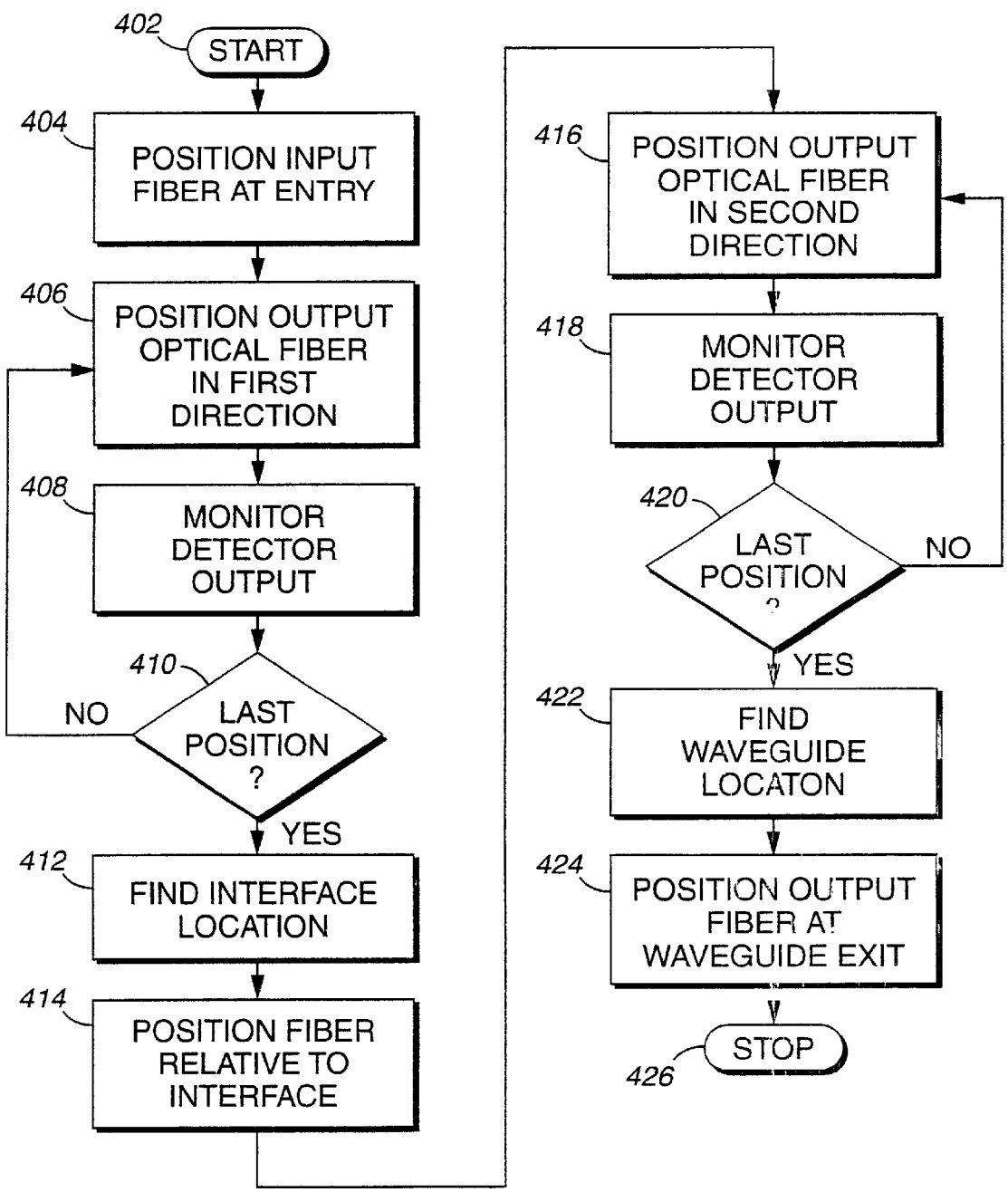
FIG. 4 is a flowchart of a method for locating the exit of an optical waveguide according to the present invention.

A flowchart of the preferred method for determining the exit from an optical waveguide is shown FIG. 4. Following start block 402, an input optical fiber, connected to a laser light source, is positioned at the entry to the waveguide at block 404. An output optical fiber is positioned in proximity to the exit of the waveguide at block 404, within the region of uncertainty for the position of the exit to the waveguide. The output optical fiber is optically coupled to a light detector at one end. At block 408, the output from the light detector is monitored. The output optical fiber is then repeatedly moved in a first direction, substantially perpendicular to plane of the interface between the core/cladding layer and a covering layer, to a new position. The output from the light detector is monitored at each position. After each new position is monitored, a check is made at decision block 410 to determine if this is the last position within the window of uncertainty for the exit position. If it is not, as denoted by the negative branch from decision block 410, the output optical fiber is moved to a new position. If it is the last position, as depicted by the affirmative branch from decision block 410, the position of the core/cladding layer in the first direction is determined at block 412 as the output optical fiber position for which the monitored light detector output was at a maximum. The exit to the optical waveguide is at a predetermined distance in the first direction from the interface. The output optical fiber is then positioned in the first direction at the exit to the optical waveguide and in a second direction in the proximity of the waveguide, as indicated by block 416.

At block 418, the output from the light detector is monitored. The output optical fiber is then repeatedly moved in the second direction, substantially perpendicular to the first direction and parallel to the face of the optical device containing the exit to the waveguide, to a new position. The output from the light detector is monitored at each position. After each new position is monitored, a check is made at decision block 420 to determine if this is the last position within the window of uncertainty for the exit position. If it is not, as denoted by the negative branch from decision block 420, the output optical fiber is moved in the second direction to a new position. If it is the last position, as depicted by the affirmative branch from decision block 420, the position of the waveguide in the first direction is determined at block 422 as the output optical fiber position for which the monitored light detector output was at a maximum. At block 424, the output optical is positioned, in the first and second directions, at the exit to the optical waveguide. The process is terminated at block 426.

Following the methods described in reference to FIGS. 3 and 4, the input and output optical fibers are positioned at the entry and exit to the waveguide, as so the location of the waveguide is identified. A further, even more accurate, adjustment of the input and output optical fiber positions may be made by adjusting the fibers until the output from the light detector is maximized.

With the optical fibers in these positions, the optical device may be subject to measurement or test, or may be configured for assembly.

Figure 5:
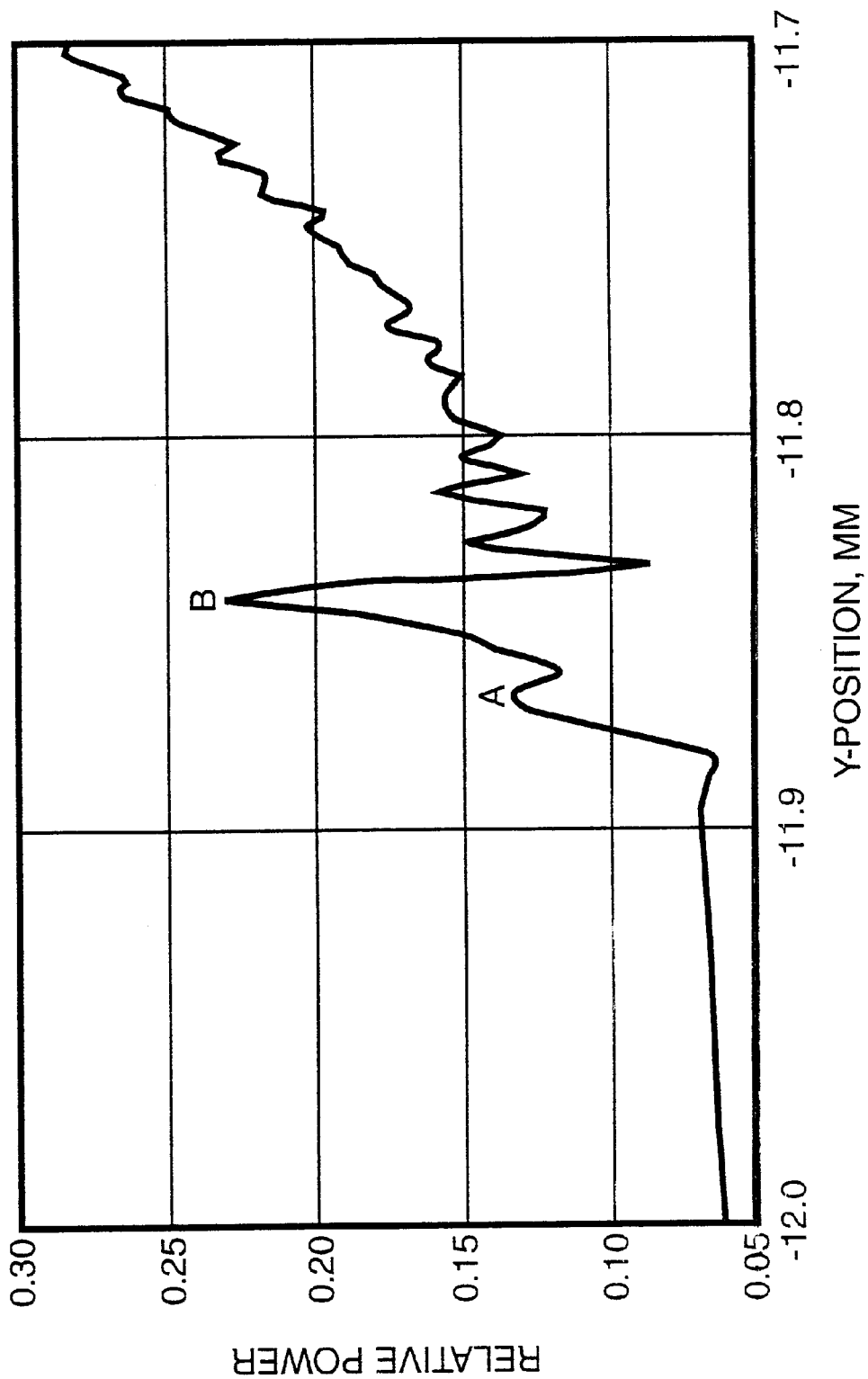
FIG. 5 is a graph showing the relationship between the position of an optical fiber in a first direction and the output voltage from a light detector.

FIG. 5 is a graph showing the relationship between the position of an optical fiber in a first direction and the output signal from a light detector. The first direction is substantially perpendicular to plane of the interface between the core/cladding layer and a glass lid, covering layer. The peak labeled 'A' occurs when the optical fiber is at the position of the waveguide. The peak labeled 'B' occurs when the optical fiber is at the position of the interface between core/cladding layer and a glass lid covering layer. The waveguide is usually at a predetermined distance from the interface, so that either peak could be used to identify the position of the waveguide. The maximum point of the graph of FIG. 5 may be determined using rate of change or other known processing techniques.

Figure 6:
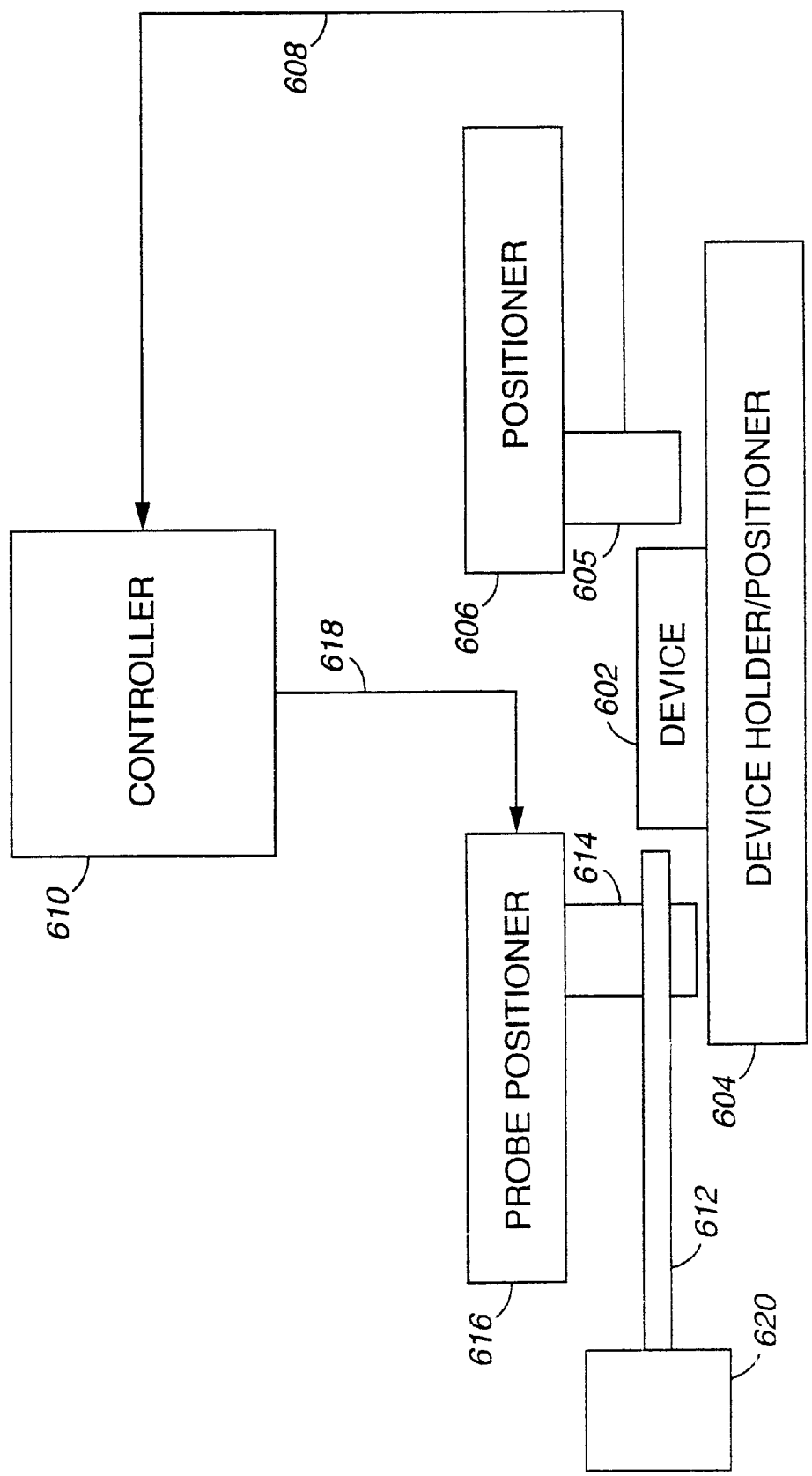
FIG. 6 is a diagrammatic representation of an automated system of the present invention configured to locate the entry to an optical waveguide.

FIG. 6 is a diagrammatic representation of an automated system of the present invention configured to locate the entry to an optical waveguide. The device 602 containing the waveguide is held in place and positioned by a device holder/positioner 604, which may for example be a positioning stage controlled by a linear servo-motor. The device holder/positioner 604 may hold more the one deivce. A large area photodiode 605, such as a InGaAs detector, is positioned in proximity to the waveguide exit using positioner 606. Positioner 606 is preferably capable of motions in at least two directions. The output signal 608 from the large area photodiode 605 is passed to controller 610, where it is monitored. The controller 610 is preferably a digital controller, which includes signal conditioning electronics, an analog-to-digital converter, a processor and memory. The operation of the controller 610 is preferably controlled by software.

An optical fiber probe 612 is positioned in proximity the entry to the optical waveguide. The optical fiber probe 612 is held by fiber holder 614 and is positioned by probe positioner 616. The probe positioner 616 is capable of motion in at least two and preferably three directions and is controlled by signals 618 from controller 610. The optical fiber probe is optically coupled to laser light source 620, and is operable to form a light beam at the end of the optical fiber probe in proximity to the waveguide entry.

Figure 7:
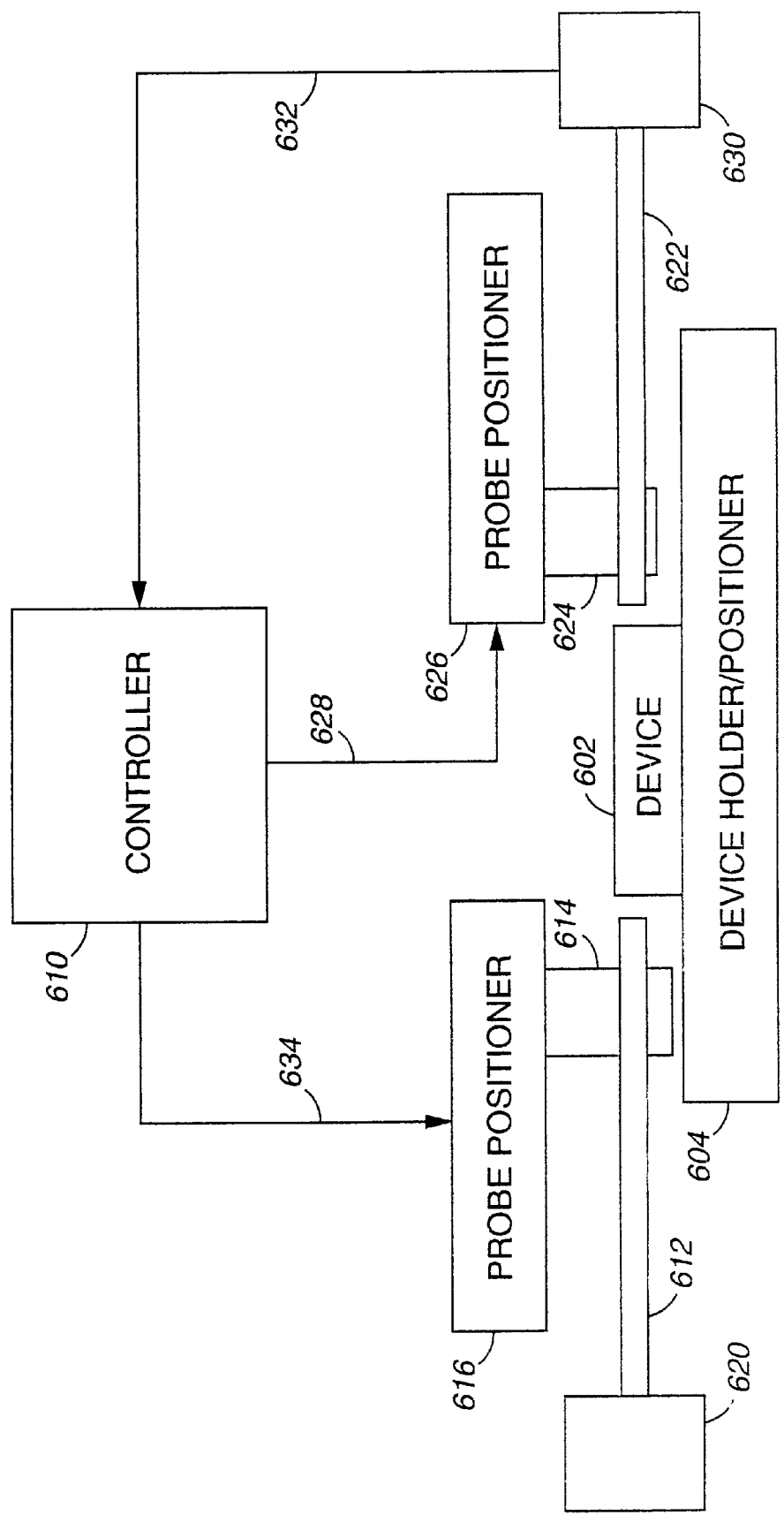
FIG. 7 is a diagrammatic representation of an automated system of the present invention configured to locate the exit from an optical waveguide.

FIG. 7 is a diagrammatic representation of an automated system of the present invention configured to locate the exit from an optical waveguide. The device 602 containing the waveguide is held in place and positioned by a device holder/positioner 604, which may for example be a positioning stage controlled by a linear servo-motor. An input optical fiber probe 612 is positioned at the entry to the optical waveguide. The input optical fiber probe 612 is held by fiber holder 614 and is positioned by probe positioner 616. The input optical fiber probe is optically coupled to laser light source 620, and is operable to form a light beam at the end of the optical fiber probe in proximity to the waveguide entry. An output optical fiber probe 622 is held by fiber holder 624 is positioned in proximity to the waveguide exit using output probe positioner 626. Output probe positioner 626 is capable of motions in at least two and preferably three directions and is controlled by signals 628 from the controller 610. Output probe positioner 626 may also be operable to adjust the orientation of the probe relative to the face of the optical device. The output optical fiber 622 is optically coupled to optical power meter 630. The output signal 632 from the optical power meter 630 is passed to controller 610, where it is monitored.

Once the locations entry and exit to the waveguide have been identified, a further refinement of the locations may be performed using the system in FIG. 7. In this process, the controller 610 controls the probe positioner 616 using signal 634 and the probe positioner 626 using signal 628 so as to maximize the output signal 632 from the optical power meter 630. This maximization may be achieved by a variety of methods, including a systematic search or a gradient search, in which the probes are moved in directions which increase the output signal 632. Such search techniques are known in the art.

While the invention has been particularly shown and described with reference to a preferred embodiment, it will be understood by those skilled in the art that various changes in form and detail may be made therein without departing from the spirit and scope of the invention. It is noted that while the term "photodiode" is used in the description of the preferred embodiment, one of skill in the art will recognize that any applicable photo detector, such as a light detector or optical power meter, may be used without departing from the spirit and scope of the invention. For example, a system may use light collecting optics, i.e. lens, as opposed to using a large area photodiode. Similarly, a light source of any applicable type, including a broadband light source, may be substituted for the laser light source described herein. Moreover, while the exemplary embodiment of the present invention discloses an entry in a first face and an exit in a second face of the optical device, it is understood that different entry and exit configurations are encompassed within the invention and do not depart from the spirit and scope of the present invention. For instance, the entry and exit may in fact reside on the same face of the optical device or there may be multiple exit points of the optical device.

What is claimed is:

1. A system for locating a waveguide within an optical device, the waveguide having an entry and an exit in the optical device, the optical device having a first layer containing the waveguide and a second layer substantially covering the first layer, the system comprising:
    an input optical fiber probe, with a receiving end and a transmitting end, adapted to receive laser light at the receiving end and to transmit light at the transmitting end;
    a fiber holder for retaining the input optical fiber probe;
    a first positioning element coupled to the fiber holder and operable to position the input optical fiber probe at a plurality of locations within a planar region parallel to the first layer containing the waveguide; and
    a light detector positioned in proximity to the waveguide exit and operable to detect light from the optical device and to generate a plurality of output signals indicative of the amount of light detected for each of the plurality of input optical fiber probe locations;
    whereby the position of the waveguide entry is determined in accordance with the plurality of output signals.

2. The system of claim 1, further comprising a laser light source coupled to the receiving end of the input optical fiber probe.

3. The system of claim 2, wherein the laser light source is a broadband light source.

4. The system of claim 1, further comprising a second positioning element coupled to the light detector and operable to position the light detector in proximity to the waveguide exit.

5. The system of claim 1, further comprising:
    a controller, responsive to the plurality of output signals from the light detector and operable to control the first positioning element and thereby adjust the position of the input optical fiber probe.

6. The system of claim 1, wherein the input optical fiber probe comprises a matrix of optical fiber in a glass array holder.

7. The system of claim 1, wherein the waveguide has the entry in a first face of the optical device and the exit in a second face of the optical device, and wherein the first positioning element is operable to position the input optical fiber probe at the plurality of locations within the planar region parallel to one of the first and second faces of the first layer containing the waveguide entry.

8. A method for identifying the location of a waveguide within an optical device, the waveguide having an entry and an exit in the optical device, the optical device having a first layer containing the waveguide and a second layer substantially covering the first layer, the method comprising:
    positioning an input optical fiber probe at a plurality of locations in proximity to the waveguide entry, the input optical fiber probe having a receiving end and a transmitting end and being adapted to receive laser light at the receiving end and transmit light to the optical device at the transmitting end;
    positioning a light detector in proximity to the waveguide exit, the light detector being configured to detect light from the optical device and produce a plurality of output signals indicative of the amount of light detected for each of the plurality of input optical fiber probe locations; and
    determining the position of waveguide entry in accordance with the plurality of output signals.

9. A method as in claim 8, wherein the plurality of locations in proximity to the waveguide entry lie in a plane substantially parallel to a face of the optical device containing the waveguide entry.

10. A method as in claim 8, wherein said determining the position of the waveguide entry comprises:
    identifying the location of the interface between the first and second layers according to first output signals of the plurality of output signals produced by moving the input optical fiber probe in a first direction substantially perpendicular to an interface between the first and second layers;

placing the input optical fiber probe at a predetermined distance from the interface between the first and second layers; and identifying the location of the waveguide entry according to second output signals of the plurality of output signals produced by moving the input optical fiber probe in a second direction substantially perpendicular to the first direction and parallel to a face of the optical device containing the waveguide entry.

11. A method as in claim 10, wherein identifying the location of the interface between the first and second layers comprises finding the position of the input optical fiber probe that corresponds to a maximum in the first output signals of the plurality of output signals from the light detector.

12. A method as in claim 10, wherein identifying the location of the interface between the first and second layers comprises finding the position of the input optical fiber probe for which a corresponding output signal of the first output signals of the plurality of output signals from the light detector is most nearly equal to a predetermined value.

13. A method as in claim 10, wherein identifying the location of the waveguide entry according to second output signals of the plurality of output signals comprises finding the position of the input optical fiber probe that corresponds to a maximum of the second output signals of the plurality of output signals from the light detector.

* * * * *